A. A. FILICKY.
AUTOMOBILE STARTER.
APPLICATION FILED APR. 19, 1919.
1,310,009.
Patented July 15, 1919.
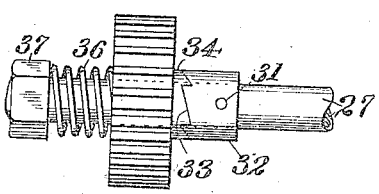
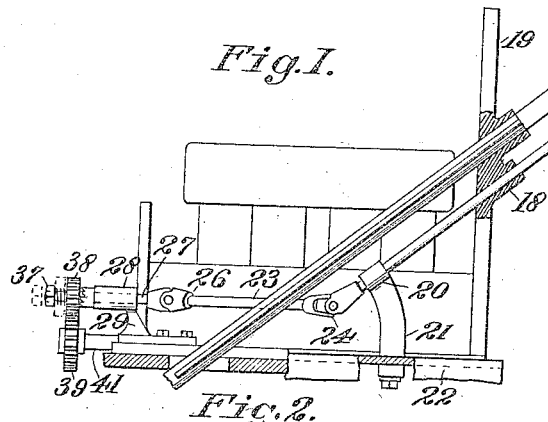
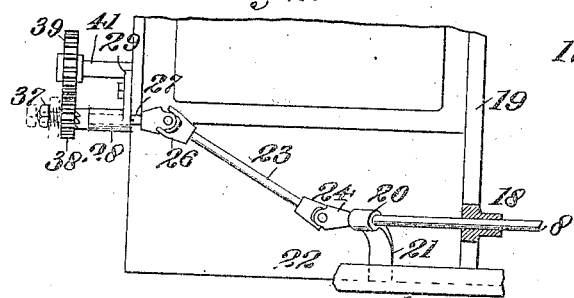
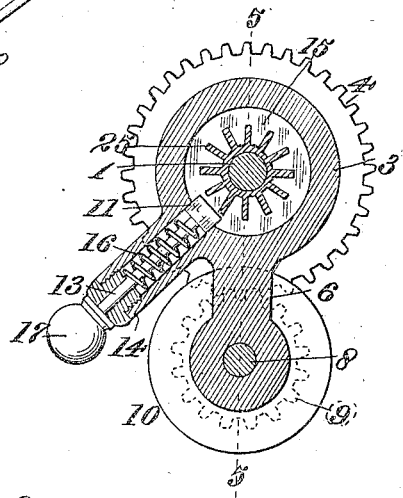
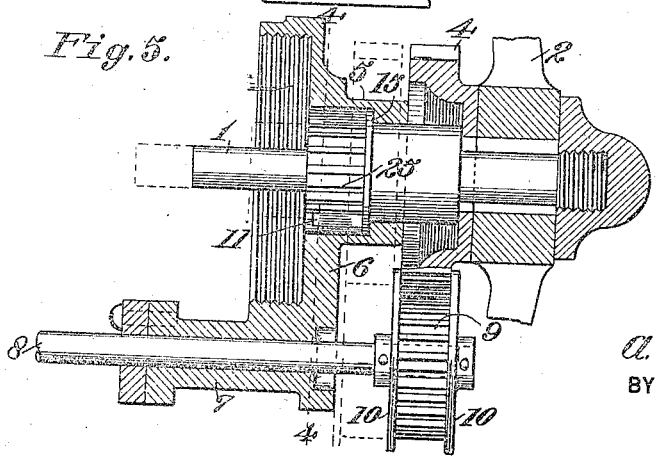
INVENTOR
A. A. Filicky.
BY F. M. Wright,
ATTORNEY

UNITED STATES PATENT OFFICE.

AUGUST A. FILICKY, OF SAN FRANCISCO, CALIFORNIA.

AUTOMOBILE-STARTER.

1,310,009. Specification of Letters Patent. Patented July 15, 1919.

Application filed April 19, 1919. Serial No. 291,203.

*To all whom it may concern:*

Be it known that I, AUGUST A. FILICKY, a citizen of the United States, residing at San Francisco, in the county of San Francisco and State of California, have invented new and useful Improvements in Automobile-Starters, of which the following is a specification.

The object of the present invention is to provide means, operable from the driver's seat, for conveniently starting the internal combustion engine of a motor car. While I have herein shown the invention as applied to a Ford car, it will be perceived that, with suitable changes, it can equally well be applied to other cars.

In the accompanying drawing, Figure 1 is a side view of the invention, shown as applied to a Ford car, parts being in section and parts of the motor car not necessary to be shown being omitted; Fig. 2 is a broken plan view of the same; Fig. 3 is an enlarged side view of a detail of the invention; Fig. 4 is a cross section on the line 4—4 of Fig. 5; Fig. 5 is an enlarged broken longitudinal section on the line 5—5 of Fig. 4.

Referring to the drawing, 1 indicates the short steering shaft of a Ford car and 2 the steering wheel. The ordinary cap which surrounds the steering shaft 1, is removed, and in place thereof is substituted a cap 3 of the same general dimensions but having a gear ring 4 therearound. Formed integral with the bearing 5 for said shaft 1 is an extension 6 having a bearing 7 for a starting shaft 8, which extends immediately below the steering post and in the same general direction. Upon the upper end of said starting shaft 8 is secured a pinion 9, which is always maintained in mesh with the gear ring 4 by washers 10 secured to the shaft 8 and which overlap the gear ring 4.

As is well known, for steering purposes the short steering shaft 1 has thereon a pinion 25 which connects through planetary gears with the steering post. In my invention the pinion 25 is held in engagement with said planetary gears by means of the head 11 of a pin 13, slidable in a tubular extension 14 from said bearing 5, which head 11 then, as shown in dotted lines in Fig. 5 engages the upper side of a flange 15 on the shaft 1 above said pinion 25. Said pin 13 is pressed inwardly by a spring 16 coiled around the pin, and can be drawn out by a knob 17. When said pin 13 is withdrawn, the steering wheel 2 and shaft 1 can be raised out of operative connection with the steering post, the gear wheel 4 still meshing with the pinion 9. The pin 13 is then released and the spring 16 returns it to its former position in which it now engages the lower side of the flange 15, as shown in full lines in Fig. 5. Then by turning the steering wheel the starting shaft 8 can also be turned.

Said shaft 8 extends through a bearing 18 in the apron or dashboard 19 of the car and its lower portion extends through a bearing 20 carried by an arm 21 secured to the frame 22 of the car, and is connected by an intermediate shaft 23, and knuckle joints 24, 26, with a horizontal forwardly extending shaft 27 rotatable in a bearing 28 supported by an arm 29, secured to a portion of the car frame. Said shafts 8, 23, 27, and knuckle joints 24 and 26, thus constitute a single flexible starting shaft. Said shaft carries, secured thereto, as shown at 31, a sleeve 32, having its outer end formed with ratchet teeth, and said sleeve also carries, loose thereon, a sleeve 34 having ratchet teeth engaging the ratchet teeth 33 and pressed into said engagement therewith by a spring 36 coiled around the shaft 27 and compressed between said sleeve 34 and a nut 37 screwed on said shaft 27. Said sleeve 34 carries a pinion 38 which can mesh with a gear wheel 39 on an engine shaft 41.

When the steering wheel is withdrawn out of its operative position for steering, as shown in solid lines in Fig. 5, the shaft 8 is moved longitudinally by reason of the engagement of the washers 10 with the gear ring 4 and thereby also the shaft 27 is moved longitudinally so that the pinion 38 is moved into engagement with the gear wheel 39. Then, on rotating the steering wheel 2, the shaft 27 is rotated, thereby rotating the engine shaft 41 and starting the engine. When the steering wheel 2 is returned to its steering position, the shafts 8 and 27 are moved longitudinally so that the pinion 38 is out of engagement with the gear wheel 39, as shown in dotted lines in Fig. 2, and the engine shaft is free to rotate.

By reason of the operative connection between the engine shaft 41 and the shaft 8 being through the ratchet clutch 33, said shaft 41 is free to rotate faster than the shaft 8.

I claim:

1. In combination with a steering wheel of an automobile and means, movable into operative and inoperative positions, for rotating the engine shaft of an automobile, an operative connection between said means and the steering wheel of the automobile whereby a rotary movement of the steering wheel operates said means when the latter is in its operative position to rotate said engine shaft, and a different movement of the steering wheel moves said means from operative to inoperative position.

2. In combination with means movable into operative and inoperative positions, for rotating an engine shaft of an automobile, a steering wheel movable into operative and inoperative positions for steering, means whereby a movement of the steering wheel into its inoperative position is accompanied by a movement of said means into its operative position and conversely, and rotation of the steering wheel in its inoperative position rotates the engine shaft.

3. In combination with a steering wheel of an automobile slidable into positions operative and inoperative for steering, a rotary flexible shaft, means whereby said rotary shaft rotates with the steering wheel, a gear wheel on the forward end of said shaft, and a gear wheel on the engine shaft adapted to mesh with the first-named gear wheel in one position of said flexible shaft.

4. In combination with a steering wheel of an automobile, slidable into positions operative and inoperative for steering, a rotary flexible shaft, means whereby said rotary shaft rotates with the steering wheel, a gear wheel on the forward end of said shaft, and a gear wheel on the engine shaft adapted to mesh with the first-named gear wheel in the position of said flexible shaft corresponding to the inoperative position of the steering wheel.

5. In combination with a steering wheel of an automobile slidable into positions operative and inoperative for steering, a rotary flexible shaft, means whereby said rotary shaft rotates with the steering wheel, a gear wheel on the forward end of said shaft, and a gear wheel on the engine shaft adapted to mesh with the first-named gear wheel in one position of said flexible shaft and operated by said shaft when rotating in one direction only.

6. In combination with a steering wheel of an automobile slidable into positions operative and inoperative for steering, a rotary flexible shaft, means whereby said rotary shaft rotates with the steering wheel, a gear wheel on the forward end of said shaft, slidable and rotatable upon said shaft, said gear wheel and shaft having coöperative clutch members, a spring for pressing said clutch members together, and a gear wheel on the engine shaft adapted to mesh with the first-named gear wheel in one position of said flexible shaft.

AUGUST A. FILICKY.